United States Patent Office
3,647,712
Patented Mar. 7, 1972

3,647,712
MIXTURE OF ALCOHOLS AND FLUORINATED
BETA-DIKETONES USEFUL AS EXTRACTANT
IN RECOVERY OF VANADIUM
Michael F. Lucid, Oklahoma City, Okla., assignor to
Kerr-McGee Corporation, Oklahoma City, Okla.
No Drawing. Filed Sept. 4, 1970, Ser. No. 69,937
Int. Cl. B01f 1/00
U.S. Cl. 252—364
4 Claims

ABSTRACT OF THE DISCLOSURE

A method for the extraction of vanadium from acidic solutions is provided which comprises extracting vanadium in the pentavalent state using a mixture of a fluorinated β-diketone and an alcohol in an organic solvent, the vanadium(V) being complexed with the extractant mixture and extracted into the organic phase.

BACKGROUND OF THE INVENTION

Fluorinated β-diketones may be utilized for the extraction of metals from acidic solutions. Although this is satisfactory for extracting many metals from acidic solutions, the method is not entirely satisfactory with respect to the recovery of vanadium from certain commercial acidic solutions such as "wet process" phosphoric acid.

Phosphoric acid generally is produced commercially by one of two methods. One method is called the "furnace" method; the other is referred to as the "wet process" method. In the wet process method, phosphate rock is contacted with a mineral acid such as sulfuric acid. Most phosphate rock contains metal compounds in varying amounts. In many cases these metal compounds are dissolved from the phosphate rock and appear in the wet process acid as contaminants. Vanadium compounds are among those dissolved from the phosphate rock, particularly when the rock is from the so-called Western phosphate deposits of Idaho, Wyoming, Utah, and Montana.

Vanadium is an undesirable component of wet process phosphoric acid in that it prevents the use of the phosphoric acid in making animal feed supplements, as the amount of vanadium must be kept at a low level in such animal feed supplements.

On the other hand, vanadium itself is a valuable material and wet process phosphoric acid can be an important source of this material. Therefore, a process for recovery of vanadium from wet process phosphoric acid provides an important benefit, in that the vanadium is converted from an undesirable contaminant to a valuable by-product.

Heretofore, attempts have been made to recover vanadium from wet process phosphoric acid. One involves addition of a soluble ferrocyanide compound to the acid to precipitate the vanadium, as described more fully in U.S. Pat. No. 1,544,911. Other such processes involve extraction of the acid with an organic extractant for the vanadium. U.S. Pat. No. 2,211,119 describes a process in which the preferred organic extractant is isopropyl ether. U.S. Pat. No. 3,437,454 describes a process in which the preferred organic extractant is an alpha-hydroxy oxime.

SUMMARY OF THE INVENTION

In accordance with this invention, it has been discovered that vanadium can be recovered from commercial aqueous acidic solutions such as wet process phosphoric acid by subjecting the aqueous acidic solution to treatment using a novel mixture of extractants in an organic diluent two phases form. The vanadium values are extracted from the acid solution into the organic phase. That loaded organic phase can then be recovered due to the imiscibility of the aqueous and the organic phases. Thereafter, the vanadium can be stripped from the organic phase and precipitated. The extractant mixture comprises a component (a) consisting of at least one fluorinated β-diketone and a second component (b) comprising a long chain alcohol or mixtures thereof.

According to this invention, a solution containing vanadium in the pentavalent oxidation state is contacted with the extractant mixture in a water-immiscible diluent. The concentration of the extractant mixture in the diluent may vary widely.

The organic and aqueous phases are allowed to separate. The aqueous phase (raffinate) is returned to the acid plant or discarded.

The loaded organic phase is scrubbed with an aqueous solution at some desirable pH to remove coextracted impurities while leaving the vanadium loaded on the organic phase. The aqueous scrub solution may be recycled or discarded as desired.

The scrubbed organic phase is stripped by treatment with $SO_2$, $H_2S$ or like agent in mineral acid to reduce vanadium(V) to vanadium(IV) to give a pure vanadium concentrate. Alternately, it can be stripped with a base such as sodium carbonate.

If the aqueous acidic solution to be extracted contains vanadium in lower oxidation states, it is necessary to oxidize the solution until the vanadium is essentially all in the pentavalent oxidation state prior to the extraction process of this invention.

The fluorinated β-diketone component (a) is represented by the formula:

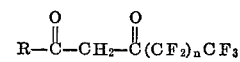

wherein R is a radical selected from the group consisting of (a) aromatic radicals containing from 6 to 14 ring carbon atoms, which may contain conventional substituents such as alkyl, halo, nitro, alkoxy, and amino groups;
(b) heterocyclic radicals containing five and six ring members wherein from one to two of the ring members may be selected from the group consisting of oxygen, sulfur and nitrogen, and which may contain conventional substituents such as alkyl, halo, nitro, alkoxy and amino groups; and
(c) aliphatic and substituted aliphatic radicals and n has a value of 0 to 15.

The fluorinated β-diketones of component (a) are characterized by high oxidative stability, resistance to acidic hydrolysis, relatively high intrinsic acidity of the enolic hydrogen and powerful chelating ability.

Examples of R as an aromatic radical include phenyl, naphthyl, diphenyl and anthracyl. Examples of alkyl substituents on said aromatic radical include methyl, ethyl, n-propyl, iso-propyl, n-butyl, iso-butyl, sec-butyl, tert-butyl, n-octyl, and iso-octyl. Alkoxy groups include methoxy, propoxy, butoxy, and octyloxy. The halo substituents are fluoro, chloro, bromo and iodo. According to a preferred embodiment of the present invention, the halo substituent is fluoro.

Examples of R as an heterocyclic radical include derivatives of furan, tetrahydrofuran, isooxazole, oxazole, oxazolidine, thiazole, pyrazole, pyrrole, thiophene, morpholine, oxazine, pyrazine and piperidine.

The preferred heterocyclic groups of the above formula are represented by

wherein X is sulfur, oxygen or nitrogen.

As examples of R as an aliphatic radical may be mentioned methyl, ethyl, isopropyl, octyl, and dodecyl.

Examples of the perfluoro aliphatic radical $$-(CF_2)_n CF_3$$

are fluoro substituted straight and branched chain alkyl groups when $n$ is 0 to 15. Examples of such groups include perfluoro derivatives of methyl, ethyl, n-propyl, n-butyl, iso-butyl, tert-butyl, n-hexyl, n-octyl, iso-octyl, n-decyl, and n-dodecyl.

According to a preferred aspect of the invention, the component (a) of the above formula contains a perfluoroaliphatic group wherein $n$ is a positive integer.

According to a further preferred embodiment of the present invention, $n$ is a positive integer from 1 to 10.

Examples of particular extractants of the above formula as the following:

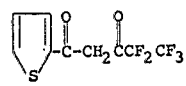

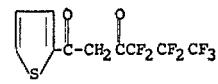

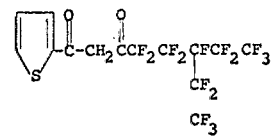

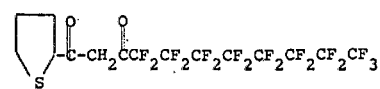

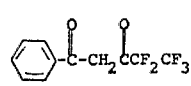

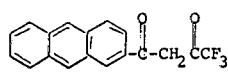

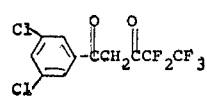

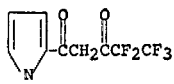

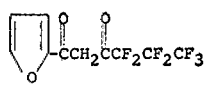

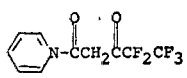

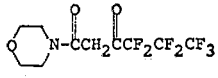

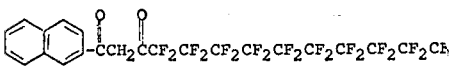

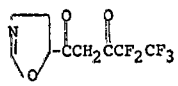

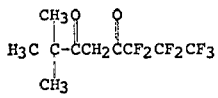

The component (b) is a long chain alcohol having from 4 to 30 carbon atoms, preferably from 8 to 18 carbon atoms. Exemplary are octanol, nonanol, decanol, dodecanol, tridecanol, pentadecanol, and octadecanol.

The extractants of this invention comprise a mixture of the two components in a molar ratio (a):(b) generally of about 1:6 to about 4:1. Preferably, said ratio is 1:4.

Although in certain instances, such as when treating acidic solutions of relatively high pH, the fluorinated β-diketone component (a) can be used alone in the recovery of vanadium, the novel extractant mixture of the present invention provides a far greater recovery than when it is used alone. The alkanols of component (b) furthermore have not been found very useful by themselves as extractants, and it is therefore surprising that the extraction ability of the fluorinated β-diketones is greatly enhanced by the presence of the alkanol.

The amount of the novel extractant mixture relative to the amount of the water-immiscible organic solvent may vary widely. Generally, the total amount of the novel extractant mixture will vary from about 0.1% to 100% by weight based on the total weight of the organic phase. A preferred percentage range is from 0.5% to 10%. The ratio of the organic phase to the acidic phase is not critical.

The term "water-immiscible" organic solvent as used herein refers to an organic material normally liquid at ambient temperatures which is substantially, but not necessarily entirely, insoluble in water. The preferred organic solvents for the process of the present invention are the hydrocarbons. Examples of suitable hydrocarbon solvents include isooctane, kerosene, "Soltrol 170" (a commercially available naphthenic hydrocarbon solvent), benzene, toluene, xylene, isodecane, fuel oils, mineral oils, hexane, heptane, octane, "Panasols" (commercially available petroleum aromatic solvents), "Napoleum 470"

(commercially available petroleum naphtha), and the like. Solvents which contain functional groups can also be employed providing that the functional groups do not adversely affect the extraction. Thus, chlorinated and fluorinated hydrocarbons such as carbon tetrachloride, trichloroethylene and perfluorokerosene can be used.

The foregoing description and the following specific examples are for purposes of illustration, and are not to be considered as limiting the scope of the present invention, reference being had to the appended claims for this purpose.

Examples I–IV are illustrative of the method of preparing certain compounds suitable for use as component (a):

EXAMPLE I 4,4,4-trifluoro-1-pentafluorophenyl-1,3-butanedione

Dried sodium methoxide (0.1 mole) was suspended in anhydrous ether (100 ml.). Ethyl trifluoroacetate (14.2 g., 0.1 mole) in anhydrous ether (15 ml.) was added dropwise to the stirred suspension. During the exothermic reaction, nearly all of the sodium methoxide reacted. Acetylpentafluorobenzene (21.0 g., 0.1 mole) in anhydrous ether (15 ml.) was added dropwise. This reaction was exothermic and the remainder of the sodium methoxide reacted. The resultant yellow, homogeneous reaction mixture was allowed to stand at room temperature overnight under a nitrogen blanket. Work-up was effected by addition of concentrated sulfuric acid (3 ml.) in water (30 ml.) followed by extraction with ether and washing with water. The ethereal extract was dried over anhydrous sodium sulfate and evaporated in vacuo. The crude product was distilled through a column packed with glass helices, 14.8 g., B.P. 77–79°/4.7 torr (48.4 percent yield). A gas chromatogram (150°, 2 meter 20 percent SF–96 on Chromosorb P) of the pure liquid showed retention time of 5.6 min. An infrared spectrum (oil smear) of the compound showed strong absorption centered at 1620 cm.$^{-1}$ (C=O) and a broad region centered at 1180 cm.$^{-1}$ (C—F); The UV spectrum indicated $$\lambda_{maximum}^{n-hexane}\ 289\ m\mu\ (\epsilon\ 10,820)$$

The NMR spectrum (ref., Si(CH$_3$)$_4$) possessed a broad peak of chemical shift 13.7 p.p.m. for the enolic hydrogen and a sharp singlet at 6.2 p.p.m. for the olefinic hydrogen. A $^{19}$F NMR spectrum (ref., Freon 11) displayed a peak of chemical shift 76.8 p.p.m., for the methyl fluorines and peaks at 137.6 p.p.m., 146.7 p.p.m., and 159.3 p.p.m. for the ortho, para, and meta aromatic fluorines, respectively.

Analysis.—Calcd. for C$_{10}$H$_2$F$_8$O$_2$ (percent): C, 39.23; H, 0.66; F, 49.65. Found (percent): C, 39.31; H, 0.69; F, 49.60.

EXAMPLE II 4,4,5,5,5-pentafluoro-1-pentafluorophenyl-1,3-pentanedione

Dried sodium methoxide (0.1 mole) was suspended in anhydrous ether (100 ml.) and ethyl perfluoropropionate (19.2 g., 0.1 mole) in anhydrous ether (15 ml.) was added dropwise to the stirred slurry. The reaction was exothermic and nearly all of the sodium methoxide was consumed. Dropwise addition of acetylperfluorobenzene (21.0 g., 0.1 mole) in anhydrous ether (15 ml.) caused an exothermic reaction. The rest of the sodium methoxide reacted and the reaction mixture turned yellow. After allowing the homogeneous reaction mixture to stand at room temperature overnight under a nitrogen blanket, 3 ml. of concentrated sulfuric acid and 30 ml. of water was added. The mixture was extracted with ether and the extracts washed with water. The ether solution was dried over anhydrous sodium sulfate and evaporated in vacuo. The crude product was distilled through a Vigreaux column to give 12.4 g., B.P. 83–98°/2.9 torr, which contained some higher boiling impurities, as shown by gas chromatography (150° C., 2 meters 20 percent SF–96 on Chromosorb P). This material was chromatographed on silica gel in benzene. The course of elution was followed by gas chromatography. In this way 9.7 g. (27.2 percent yield) of pure compound was isolated; however, it was red-orange in color. The color was easily removed by a flash distillation. An infrared spectrum (oil smear) of the pure compound showed strong absorption centered at 1620 cm.$^{-1}$ (C=O) and a broad region centered at 1200 cm.$^{-1}$ (C—F). The UV spectrum indicated $$\lambda_{maximum}^{n-hexane}\ 292\ m\mu\ (\epsilon\ 12,120)$$

The NMR spectrum (ref., Si(CH$_3$)$_4$) displayed a very sharp singlet of chemical shift 13.9 p.p.m. for the enolic hydrogen and a sharp singlet at 6.3 p.p.m. for the olefinic hydrogen. A $^{19}$F NMR spectrum (ref., Freon 11) displayed a peak of chemical shift 82.9 p.p.m. for the methyl fluorines, a peak at 124.6 p.p.m. for the methylene fluorines, and peaks at 139.3 p.p.m., 148.0 p.p.m., and 161.0 p.p.m. for the ortho, para, and meta aromatic fluorines, respectively.

Analysis.—Calcd. for C$_{11}$H$_2$F$_{10}$O$_2$ (percent): C, 37.10; H, 0.57; F, 53.35. Found (percent): C, 37.28; H, 0.72; F, 53.40.

EXAMPLE III 4,4,5,5,6,6,6-heptafluoro-1-pentafluorophenyl-1,3-hexanedione

Dried sodium methoxide (0.1 mole) was suspended in anhydrous ether (100 ml.) and ethyl perfluorobutyrate (24.2 g., 0.1 mole) in anhydrous ether (15 ml.) was added dropwise to the stirred suspension. The reaction was exothermic and nearly all of the sodium methoxide reacted. The reaction mixture was cooled in an ice bath before the acetylperfluoro benzene (21.0 g., 0.1 mole) was added dropwise in anhydrous ether (100 ml.) over 1 hr. After complete addition, the reaction mixture was allowed to warm to room temperature. There was no noticeable evolution of heat, but the reaction mixture slowly turned yellow as it warmed up. The reaction mixture was allowed to stand at room temperature overnight under a nitrogen blanket. Work-up was effected by addition of concentrated sulfuric acid (3 ml.) in water (30 ml.) followed by extraction with ether and washing with water. The ether extract was dried over anhydrous sodium sulfate and evaporated in vacuo. The crude product was distilled through a column packed with glass helices, 25.0 g., B.P. 88–89°/3.4 torr (62 percent yield). A gas chromatogram (150°, 2 meter 20 percent SF–96 on Chromosorb P) of the pure liquid showed a retention time of 4.9 min. An infrared spectrum (oil smear) of the compound showed strong absorption band at 1625 cm.$^{-1}$ (C=O) and a broad region centered at 1220 cm.$^{-1}$ (C—F). The UV spectrum indicated $$\lambda_{maximum}^{n-hexane}\ 292\ m\mu\ (\epsilon\ 12,550)$$

The NMR spectrum (ref., Si(CH$_3$)$_4$) displayed a sharp peak of chemical shift at 13.9 p.p.m. for the enolic hydrogen and a sharp singlet at 6.2 p.p.m. for the olefinic hydrogen. A $^{19}$F NMR spectrum (ref., Freon 11) displayed a peak of chemical shift at 80.7 p.p.m. for the methyl fluorines, peaks at 121.5 p.p.m. and 126.7 p.p.m. for the methylene fluorines, and peaks at 138.0 p.p.m., 147.6 p.p.m., and 160.1 p.p.m. for the ortho, para, and meta aromatic fluorines, respectively.

Analysis.—Calcd. for C$_{12}$H$_2$F$_2$O$_2$ (percent): C, 35.49; H, 0.50; F, 56.14. Found (percent): C, 35.36; H, 0.97; F, 56.09.

EXAMPLE IV 4,4,5,5,6,6,7,7,8,8,9,9,10,10,10-pentadecafluoro-1-pentafluorophenyl-1,3-decanedione Sodium methoxide was prepared in situ by adding sodium metal (2.4 g., 0.1 mole) to anhydrous methanol (50 ml.). After complete reaction the excess methanol was distilled and the salt was thoroughly dried by a stream of nitrogen. The sodium methoxide was suspended in anhydrous ether (100 ml.) and ethyl perfluorocaprylate (44.1 g., 0.1 mole) in anhydrous ether (25 ml.) was added dropwise to the stirred suspension. The reaction as exothermic and nearly all of the sodium methoxide reacted. The reaction mixture was cooled in an ice bath before the acetylperfluorobenzene (21.0 g., 0.1 mole) was added dropwise in anhydrous ether (100 ml.) over 1 hr. After complete addition the reaction mixture was allowed to warm to room temperature. Although there was no noticeable evolution of heat, the reaction mixture slowly turned yellow as it warmed up. After allowing the reaction mixture to stand at room temperature overnight under a nitrogen blanket, a solution of 3 ml. of concentrated sulfuric acid in 30 ml. water was added. Following extraction with ether, washing with water, and drying over anhydrous sulfate, the ether extract as evaporated in vacuo. The crude product was distilled through a column packed with glass helices, 22.2 g., B.P. 107–110°/1.2 torr (37 percent yield). A gas chromatogram (200°, 2 meter 20 percent SF–96 on Chromosorb P) indicated one major peak with a retention time of 5.5 min. for the product, and one minor peak of higher boiling impurity. An NMR spectrum (ref., $Si(CH_3)_4$) showed a very sharp peak of chemical shift at 13.9 p.p.m. for the enolic hydrogen and a peak at 6.2 p.p.m. for the olefinic hydrogen. The integrals of the two major peaks were in good agreement with theory (1:1). A $^{19}F$ NMR spectrum (ref., Freon 11) displayed a peak of chemical shift at 80.7 p.p.m. for the methyl fluorines, a region from 119.8 p.p.m. to 125.4 p.p.m. for the methylene fluorines, and peaks at 137.1 p.p.m., 146.3 p.p.m., and 159.3 p.p.m. for the ortho, para, and meta aromatic fluorines, respectively. An infrared spectrum showed strong absorption centered at 1620 cm.$^{-1}$ (C=O) and a broad region centered at 1220 cm.$^{-1}$ (C—F). The UV spectrum indicated $$\lambda_{maximum}^{n\text{-hexane}}\ 293\ m\mu\ (\epsilon\ 11,650)$$

*Analysis.*—Calcd. for $C_{16}H_2F_{20}O_2$ (percent): C, 31.70; H, 0.33; F, 62.69. Found (percent): C, 31.76; H, 0.59; F, 62.65.

The following examples show the importance of using the novel extractant mixture instead of the fluorinated β-diketone component (a) alone to achieve optimum recovery of the metal values.

Other compounds suitable for use as component (a) may be prepared by reacting an aromatic or heterocyclic compound containing an acetyl moiety with a lower alkyl ester of a perfluorinated aliphatic acid via the well known Claisen condensation:

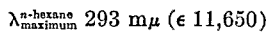

wherein R and *n* are as previously defined. The reaction is generally conducted in the presence of an alkoxide such as sodium methoxide or sodium ethoxide as a catalyst, in the presence of an inert organic solvent. Typical inert organic solvents are diethyl ether and tetrahydrofuran.

EXAMPLE V

To demonstrate the importance of an alcohol in enhancing the ability of the fluorinated β-diketone to extract vanadium (V) from acid solutions, a 1 g./l. solution of $V_2O_5$ at pH 1 was first contacted for five minutes with a 5% hexane solution of the β-diketone:

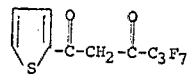

in the absence of alcohol. Only 3% of the vanadium was extracted into the organic phase.

The procedure then was repeated with 5% of tridecanol being present. Analysis of the aqueous phase indicated that 87% of the vanadium had been extracted.

EXAMPLE VI

The following example illustrates the effect of alcohol addition on the extraction of vanadium from oxidized wet process phosphoric acid (WPA).

WPA was contacted with $MnO_2$ to oxidize all of the vanadium to the pentavalent state. This aqueous acidic solution containing 1.56 g./l. $V_2O_5$ was then contacted for 20 minutes with an equal volume of 0.1 molar of 2-thenoylperfluorobutylmethane,

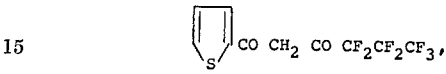

in Soltrol 170. Tridecanol concentrations ranged from zero to 0.40 molar. The results are given in the following table.

| Tridecanol (M): | Percent $V_2O_5$ extracted |
|---|---|
| None | None |
| .01 | 5.1 |
| .02 | 10.8 |
| .05 | 32.6 |
| .10 | 56.4 |
| .20 | 73.7 |
| .40 | 73.7 |

EXAMPLE VII

This example illustrates the effect of β-diketone concentration on vanadium extraction from oxidized WPA. The aqueous solution and procedure were identical to those in Example VI except that the tridecanol concentration was always 0.4 molar while the 2-thenoylperfluorobutylmethane concentration was varied. Results are shown below.

| 2-thenoylperfluorobutylmethane (M): | Percent $V_2O_5$ Extracted |
|---|---|
| None | None |
| .01 | 6.2 |
| .02 | 12.5 |
| .05 | 41.9 |
| .10 | 68.8 |
| .20 | 91.9 |

EXAMPLE VIII

Wet process phosphoric acid was oxidized so that the vanadium present is converted to the pentavalent state. Suitable oxidants are $MnO_2$ and $NaClO_3$.

The thus-oxidized wet process phosphoric acid was extracted in a four stage countercurrent extraction procedure simulated in laboratory separatory funnels.

The acid was extracted with an equal volume of extractant mixture consisting of 0.1 M 2-thenoylperfluorobutylmethane and 0.4 M tridecanol in a naphthenic hydrocarbon solvent, "Soltrol 170."

Contact time in each stage was 10 minutes. Equilibrium was attained in six cycles.

The results of this example are tabulated below:

| Stage | Aqueous (g./l. $V_2O_5$) | Organic (g./l. $V_2O_5$) |
|---|---|---|
| Feed | 1.55 | |
| 1 | 0.59 | 1.45 |
| 2 | 0.18 | 0.49 |
| 3 | 0.03 | 0.13 |
| 4 | 0.02 | 0.03 |

The data demonstrates that almost complete extraction of vanadium was achieved.

EXAMPLE IX

Vanadium in its pentavalent state was extracted from oxidized wet process phosphoric acid with an equal volume of extractant according to this invention. The extractant consisted of 0.1 M fluorinated β-diketone of the formula

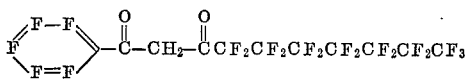

and 0.4 M tridecanol in "Soltrol 170" solvent. The extraction was conducted for a period of ten minutes. Successful extraction was demonstrated by observing that whereas the aqueous feed contained 1.60 g./l. $V_2O_5$, the raffinate contained only 0.15 g./l. $V_2O_5$.

EXAMPLE X

The process of Example IX was repeated using as the fluorinated β-diketone

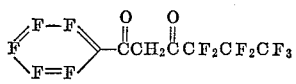

The concentration of both the fluorinated β-diketone and tridecanol was 5% for each. Otherwise, the oxidized wet process phosphoric acid was treated under conditions identical to that of Example IX. The aqueous feed contained 1.52 g./l. $V_2O_5$ whereas the aqueous raffinate only 0.27 g./l. $V_2O_5$, demonstrating successful extraction of vanadium from wet process phosphoric acid.

EXAMPLE XI

The procedure of Example IX was repeated with the same conditions used in that example, except that the compound

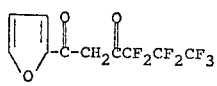

was used as the fluorinated β-diketone component (a). Whereas the aqueous feed contained 1.52 g./l. $V_2O_5$, the aqueous raffinate contained only 0.41 g./l. $V_2O_5$, showing successful extraction of the vanadium. In this example, the vanadium-containing organic phase was contacted with an aqueous acidic stripping solution containing 5% $SO_2$ and 10% $H_2SO_4$ at an aqueous to organic ratio of one for 15 minutes at 50° C. to reduce the vanadium (V) to vanadium (IV). About 90% of the vanadium (IV) was stripped into the aqueous portion of the acidic stripping solution.

What is claimed is:

1. An extractant mixture comprising a fluorinated β-diketone component (a)

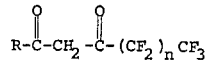

wherein R is a radical selected from the group consisting of
   (a) aromatic radicals containing form 6 to 14 ring carbon atoms, which may contain conventional substituents such as alkyl, halo, nitro, alkoxy, and amino groups;
   (b) heterocyclic radicals containing five and six ring members wherein from one to two of the ring members may be selected from the group consisting of oxygen, sulfur and nitrogen, and which may contain conventional substituents such as alkyl, halo, nitro, alkoxy and amino groups; and
   (c) aliphatic and substituted aliphatic radicals and
n has a value of 0 to 15; and a second component (b) which is an alcohol having from 4 to 30 carbon atoms, wherein the molar ratio of (a):(b) is between about 1:6 to about 4:1.

2. The extractant mixture of claim 1 wherein said alcohol is tridecanol.

3. The extractant mixture of claim 1 wherein R is a heterocyclic radical.

4. The extractant mixture of claim 1 wherein R is

wherein X is oxygen, nitrogen or sulfur.

References Cited

UNITED STATES PATENTS 2,313,621  3/1943  Bruson ............ 252—171 X
2,910,442  10/1959  Kaplan ............ 252—364

RICHARD D. LOVERING, Primary Examiner

U.S. Cl. X.R.

23—19 V

UNITED STATES PATENT OFFICE
CERTIFICATE OF CORRECTION

Patent No. 3,647,712                Dated March 7, 1972

Inventor(s) Michael F. Lucid

It is certified that error appears in the above-identified patent and that said Letters Patent are hereby corrected as shown below:

Column 4, line 25, the formula should read --

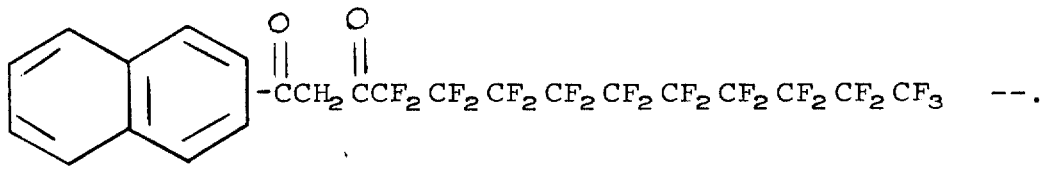

Column 7, line 7, "as" should read -- was --.

Column 9, line 3, the formula should read --

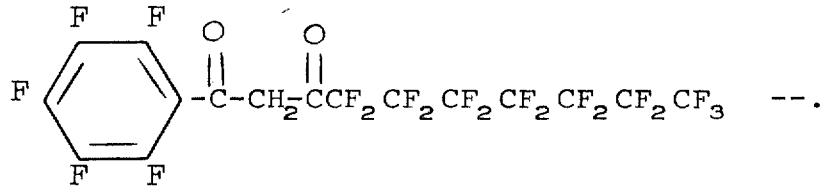

Column 9, line 16, the formula should read --

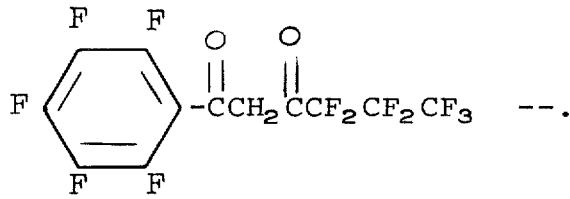

Signed and sealed this 25th day of July 1972.

(SEAL)
Attest:

EDWARD M. FLETCHER, JR.        ROBERT GOTTSCHALK
Attesting Officer               Commissioner of Patents